(12) United States Patent
Walle

(10) Patent No.: US 9,665,363 B2
(45) Date of Patent: *May 30, 2017

(54) FEATURE EXPLOITATION EVALUATOR

(71) Applicant: International Business Machines Corporation, Armonk, NY (US)

(72) Inventor: Marna L. Walle, Pawling, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/852,800

(22) Filed: Sep. 14, 2015

(65) Prior Publication Data

US 2016/0371073 A1 Dec. 22, 2016

Related U.S. Application Data

(63) Continuation of application No. 14/741,494, filed on Jun. 17, 2015.

(51) Int. Cl.
   *G06F 9/44* (2006.01)
   *G06F 9/445* (2006.01)
   *G06F 17/27* (2006.01)

(52) U.S. Cl.
   CPC ............. *G06F 8/65* (2013.01); *G06F 8/61* (2013.01); *G06F 17/2705* (2013.01)

(58) Field of Classification Search
   CPC ..................................... G06F 8/61; G06F 8/65
   USPC ................................................. 717/168, 174
   See application file for complete search history.

(56) References Cited

U.S. PATENT DOCUMENTS

| 5,101,491 | A  | * | 3/1992  | Katzeff ............... | G06F 8/41 703/22  |
| 5,742,829 | A  | * | 4/1998  | Davis ................. | G06F 8/61 717/178 |
| 7,594,219 | B2 | * | 9/2009  | Ramachandran ....... | G06F 8/65 713/100 |
| 7,930,273 | B1 | * | 4/2011  | Clark ................. | G06F 8/71 707/638 |
| 2007/0074201 | A1 | * | 3/2007 | Lee ................... | G06F 8/65 717/173 |
| 2007/0294684 | A1 | * | 12/2007 | Kumashiro .......... | G06F 8/65 717/168 |
| 2008/0201705 | A1 | * | 8/2008 | Wookey .............. | G06F 8/68 717/175 |
| 2014/0196020 | A1 | * | 7/2014 | Shetty ............... | G06F 8/68 717/171 |

(Continued)

*Primary Examiner* — Phillip H Nguyen
(74) *Attorney, Agent, or Firm* — Cantor Colburn LLP; Steven Chiu

(57) ABSTRACT

In one embodiment, a computer-implemented method includes maintaining a feature repository that includes one or more current feature descriptors describing one or more current features currently incorporated into a computer system. A new feature descriptor is read describing a new feature. By a computer processor, the new feature descriptor is evaluated with respect to a computer system. The evaluating includes comparing the new feature descriptor to the one or more current feature descriptors. Exploitation data is generated based on the evaluating, where the exploitation data describes a potential use of the new feature on the computer system. The exploitation data is returned to a user.

6 Claims, 4 Drawing Sheets

(56) References Cited

U.S. PATENT DOCUMENTS

2014/0237462 A1* 8/2014 Zheng .................. G06F 8/62
717/170
2015/0186128 A1* 7/2015 Patton .................. G06F 8/61
717/171

* cited by examiner

FEATURE EXPLOITATION EVALUATOR

DOMESTIC PRIORITY

This application is a continuation of U.S. patent application Ser. No. 14/741,494, filed Jun. 17, 2015, the disclosure of which is incorporated by reference herein in its entirety.

BACKGROUND

Various embodiments of this disclosure relate to computer upgrades and, more particularly, to a feature exploitation evaluator.

When new features, such as new hardware or software, become available for a computer system, it is useful to know whether those features will be worth exploiting. Currently, a manufacturer of a feature provides documentation. A computer system's administrator can then review the documentation and decide whether to incorporate the feature.

SUMMARY

In one embodiment of this disclosure, a computer-implemented method includes maintaining a feature repository that includes one or more current feature descriptors describing one or more current features currently incorporated into a computer system. A new feature descriptor is read describing a new feature. By a computer processor, the new feature descriptor is evaluated with respect to a computer system. The evaluating includes comparing the new feature descriptor to the one or more current feature descriptors. Exploitation data is generated based on the evaluating, where the exploitation data describes a potential use of the new feature on the computer system. The exploitation data is returned to a user.

In another embodiment, a system includes a memory having computer readable instructions and one or more computer processors for executing the computer readable instructions. The computer readable instructions include maintaining a feature repository that includes one or more current feature descriptors describing one or more current features currently incorporated into a computer system. Further according to the computer readable instructions, a new feature descriptor is read describing a new feature. The new feature descriptor is evaluated with respect to a computer system. The evaluating includes comparing the new feature descriptor to the one or more current feature descriptors. Exploitation data is generated based on the evaluating, where the exploitation data describes a potential use of the new feature on the computer system. The exploitation data is returned to a user.

In yet another embodiment, a computer program product for evaluating a new feature includes a computer readable storage medium having program instructions embodied therewith. The program instructions are executable by a processor to cause the processor to perform a method. The method includes maintaining a feature repository that includes one or more current feature descriptors describing one or more current features currently incorporated into a computer system. Further according to the method, a new feature descriptor is read describing a new feature. The new feature descriptor is evaluated with respect to a computer system. The evaluating includes comparing the new feature descriptor to the one or more current feature descriptors. Exploitation data is generated based on the evaluating, where the exploitation data describes a potential use of the new feature on the computer system. The exploitation data is returned to a user.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are evaluation systems, methods, and computer program products configured to provide feature descriptors and to evaluate those feature descriptors with respect to a computer system, so as to distill information understandable to a user. As a result, the user can decide whether the features described in the feature descriptors are worth exploiting, given the benefits described in the feature descriptors.

Figure 1:
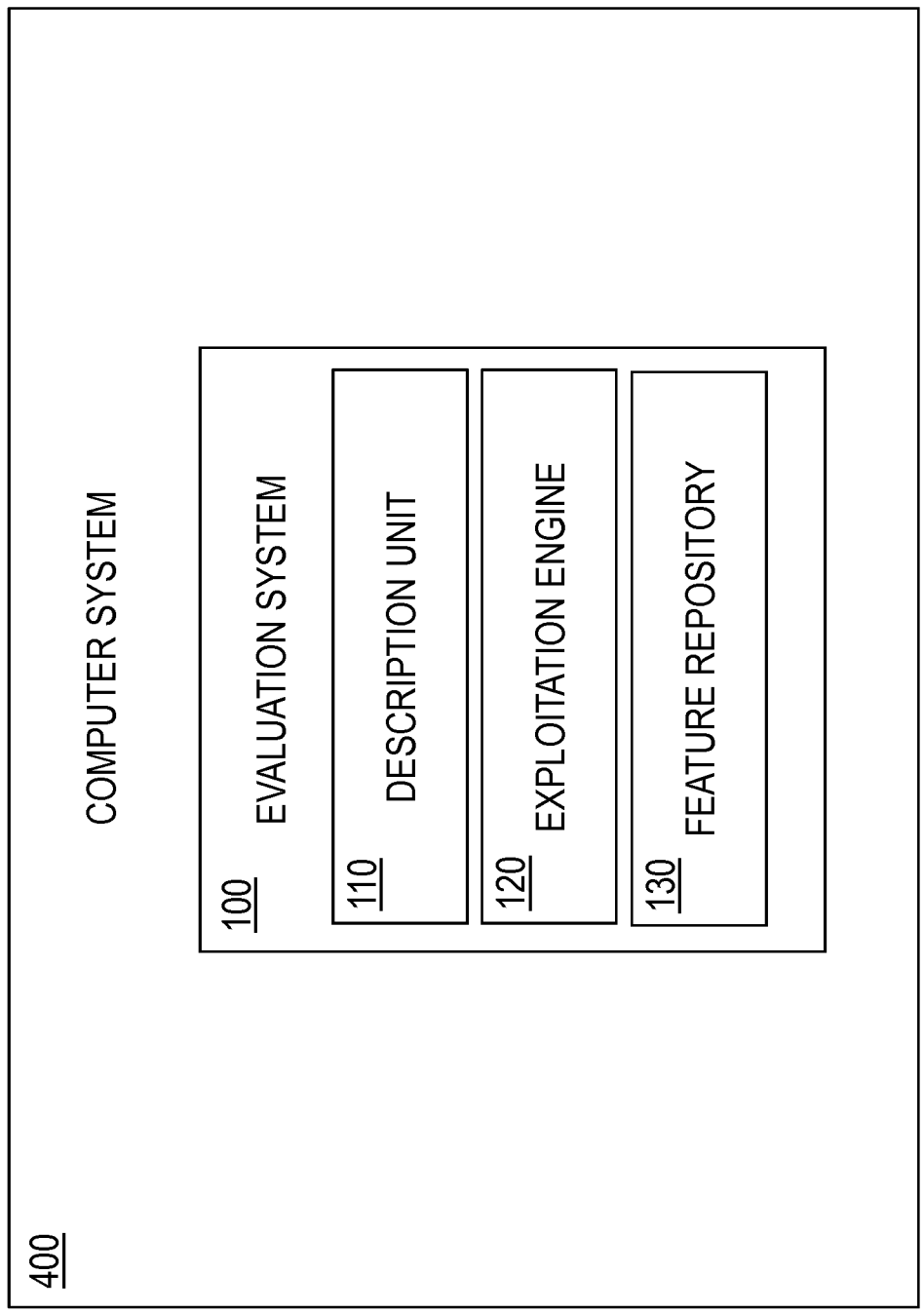
FIG. 1 is a block diagram of an evaluation system, according to some embodiments of this disclosure.

FIG. 1 is a block diagram of an evaluation system 100, according to some embodiments of this disclosure. As shown, the evaluation system 100 may reside, in whole or in part, on a computer system 400. The evaluation system 100 may include a description unit 110, an exploitation engine 120, and a feature repository 130. Generally, the description unit 110 may analyze feature data related to a feature and may output a feature descriptor, and the exploitation engine 120 may evaluate the feature descriptor with respect to the computer system 400 and may output useful information about potential incorporation of the feature into the computer system 400. In some embodiments, the exploitation engine 120 may utilize the feature repository 130, which may include feature descriptors of features currently installed on the computer system 400.

The description unit 110, the exploitation engine 120, and the feature repository 130 may each include hardware, software, or a combination of both. Further, although these components 110, 120, 130 are illustrated as being distinct from one another, they may share hardware or software, or they may be further divided based on implementation.

Figure 2:
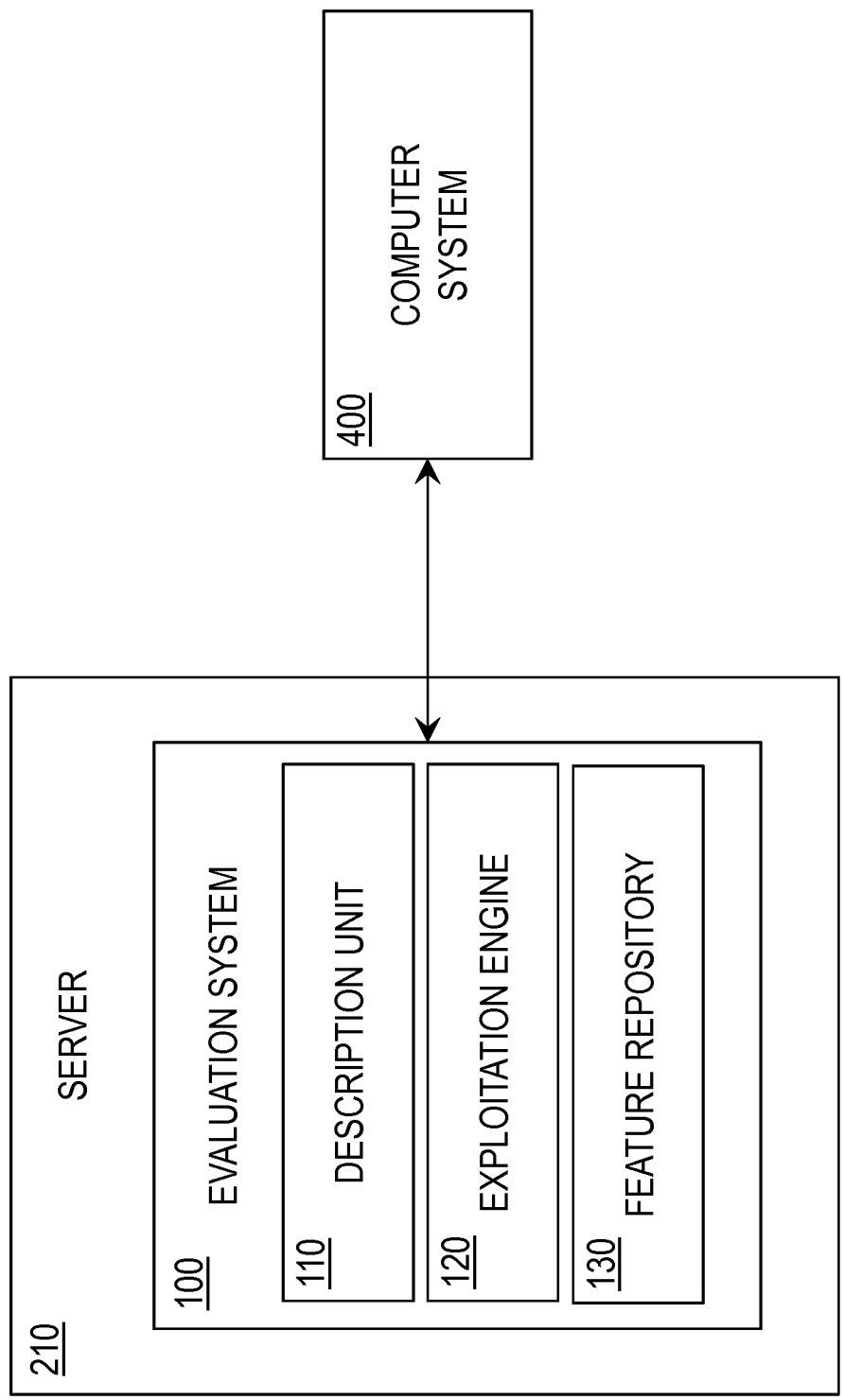
FIG. 2 is another block diagram of an evaluation system, according to some embodiments of this disclosure.

FIG. 2 is a second block diagram of the evaluation system 100, according to some embodiments of this disclosure. As shown, the evaluation system 100 need not reside on the computer system 400 being evaluated. Rather, in some embodiments, the evaluation system 100 may reside, in whole or in part, on a distinct device, such as a server 210. The server 210 may be in communication with the computer system 400, such that the server 100 may receive data, such as feature descriptors, from the computer system 400, and the server 210 may return output to the computer system 400. The feature repository 130 corresponding to the computer system 400 may also reside remotely on the server 210, thus enabling the server 210 to efficiently access feature descriptors of features already incorporated into the computer system 400.

The description unit 110 may generate one or more feature descriptors, each of which may describe an available feature. A feature may take various forms. For example, and not by way of limitation, a feature may be a software functionality or a hardware component. Each feature descriptor may be used as input for the exploitation engine 120.

To generate a feature descriptor for a feature, the description unit 110 may read feature data about that feature. For example, this feature data may include official documentation provided by the feature manufacturer or vendor, and may also include customer responses, such as unofficial documentation, web forum comments, technical documents, and publicly available customer data related to the feature. In some embodiments, the description unit 110 may use natural language processing to analyze this feature data. Various natural language processors exist in the art and may be incorporated into the description unit 110 for this purpose. For example, the description unit 110 may process the feature data with a natural language processor, which may output a tree of processed data. The description unit 110 may reconstruct the tree into a feature descriptor usable by the exploitation engine 120. A benefit of the resulting feature descriptor over one that might be provided directly from a software vendor is that this resulting feature descriptor may incorporate not only official information about the feature, but also information and advice provided by other users and incorporated into the feature data.

A feature descriptor may be a data container or data structure including various information, or fields, about the feature it describes and corresponds to. For example, and not by way or limitation, a feature descriptor may include one or more of the following information about the corresponding feature: identifier (e.g., title or name), vendor, version, date of release, dependencies (i.e., other features upon which the feature is dependent), mutual exclusions (i.e., other features that cannot operate on the same computer system 400 as the feature), and benefit.

Generally, the exploitation unit 120 may receive a feature descriptor as input when a user wishes to decide whether to incorporate the corresponding feature into the computer system 400. The exploitation engine 120 may take as input one or more feature descriptors at a time for analysis. The input feature descriptors may have been constructed by the description unit 110 or may have been received from elsewhere, such as from a software vendor. In some instances, if a new software package is available and includes multiple features, each feature of the software package may be encapsulated in a feature descriptor, and the exploitation engine may receive all the feature descriptors for the software package as input. In that case, in some embodiments, the evaluation system 100 may provide parallel output for the various feature descriptors for the user's convenience.

The exploitation engine 120 may output exploitation data about each feature described in the feature descriptors received. This exploitation data may include one or more of the following, for example: whether all dependencies for the feature are satisfied, which dependencies are not satisfied, whether the feature is already in use, whether a mutual exclusion exists, which mutual exclusions exist, whether the feature is an improvement over an existing feature in use on the computer system 400, and a benefit of the feature to the computer system 400.

In some embodiments, the feature repository 130 may maintain feature descriptors describing various features currently incorporated in the computer system 400. More specifically, in some embodiments, the feature repository 130 may include only feature descriptors for features incorporated into the computer system 400. If it is desired to retain information about unincorporated features, those corresponding feature descriptors may be maintained elsewhere or may be flagged as not having been incorporated. For the purpose of simplicity, this disclosure assumes the feature repository 130 maintains only features that are incorporated, but it will be understood that this need not be the case. A user may keep the feature repository 130 updated by notifying the evaluation system 100 of which features he intends to incorporate, or has incorporated, into the computer system 100. Thus, the evaluation system 100 may store in the feature repository 130 each feature descriptor for features incorporated into the computer system 100.

To evaluate the dependencies of a new feature having a new feature descriptor, the exploitation engine 120 may review the feature descriptors in the feature repository 130, which describe features already incorporated into the computer system 100. It will be understood that the term "new" with respect to features and feature descriptors herein need not refer only to features newly released but, rather, may also refer to previously released features that are not currently incorporated into the computer system 100 in question. In some cases, a new feature's dependencies, as provided in the new feature descriptor, may include a missing feature not already described in the feature repository 130. In those cases, the exploitation engine 120 may identify this missing feature by comparing the new feature descriptor to those in the feature repository 130. In this manner, the exploitation engine 120 may identify whether all dependencies are satisfied for the new feature and, if not, which dependencies are missing.

To evaluate whether the new feature is already in use on the computer system 400, the exploitation engine 120 may compare the identifier and version of the new feature, as provided in the new feature descriptor, with the identifiers and version numbers of the feature descriptors in the feature repository 130. If a match is found for the identifier and version, the exploitation engine 120 may determine that the new feature is already in use on the computer system 400.

To evaluate mutual exclusions, the exploitation engine 120 may compare the mutual exclusions of the new feature, as provided in the new feature descriptor, with the feature descriptors in the feature depository 130. If none of the feature descriptors in the feature depository 130 are deemed to describe features that are mutually exclusive with the new feature, the exploitation engine 120 may determine that no mutual exclusions exist. Otherwise, the exploitation engine 120 may determine that a mutual exclusion exists, and the exploitation engine 120 may identify in the exploitation data the specific features already incorporated into the computer system 400 that are mutually exclusive with the new feature.

To evaluate whether the new feature is an improvement over an existing feature on the computer system 400, the exploitation engine 120 may compare the identifier and version of the new feature, as provided in the new feature descriptor, with the feature descriptors in the feature repository. If a current feature descriptor with a matching identifier is found in the feature repository 130, the exploitation engine 120 may determine whether the version of the new feature in the new feature descriptor is newer (e.g., having a higher version number) than the version of the current feature descriptor. In some embodiments, the exploitation engine may compare release dates instead of, or in addition to, to comparing versions. If it is determined, based on version, release date, or other criteria, that the new feature is newer than the current feature described by the current feature descriptor, then the exploitation engine 120 may determine that the new feature is an improvement over the current feature and, further, that the new feature is an improvement over an existing feature in the computer system 400.

As discussed above, a feature descriptor may include a benefit of the corresponding feature. Thus, to include the benefit of the new feature in the exploitation data, the exploitation engine 120 may extract the benefit field from the feature descriptor. For example, a feature's benefit may be as follows: provides a specific new ability, improves compression, improves performance, or improves compaction ratio.

The exploitation engine 120 may return the exploitation data determined with respect to the new feature and the computer system 400. For example, the exploitation data may be stored for later use, output to a display, or printed. A user may thus review the exploitation data and decide whether to incorporate the new feature into the computer system 400.

Figure 3:
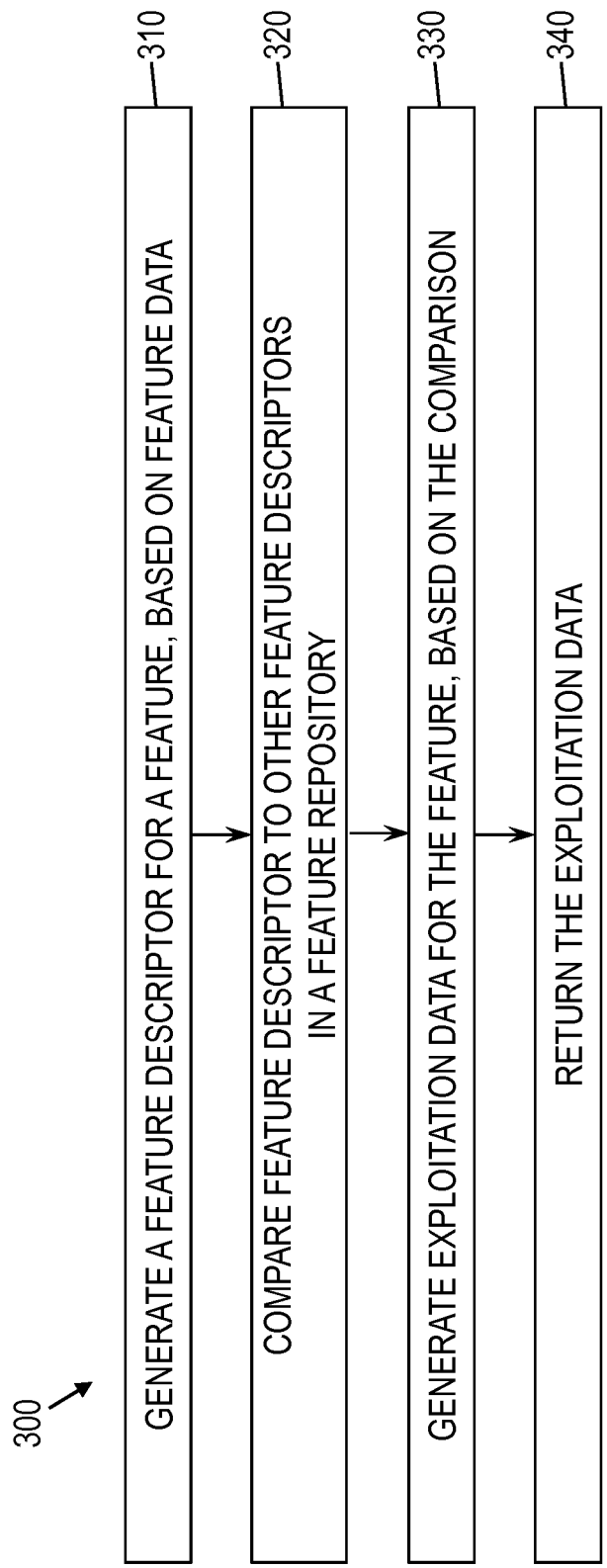
FIG. 3 is a flow diagram of a method for evaluating a feature with respect to a computer system, according to some embodiments of this disclosure.

FIG. 3 is a flow diagram of a method 300 for evaluating a feature with respect to a computer system 400, according to some embodiments of this disclosure. As shown, at block 310, a feature descriptor may be generated for a feature based on feature data. At block 320, the feature descriptor may be compared with one or more other feature descriptors in a feature repository 130. At block 330, exploitation data may be generated about the feature, based at least in part on the comparison with the other feature descriptors. At block 340, the exploitation data may be returned to a user.

Figure 4:
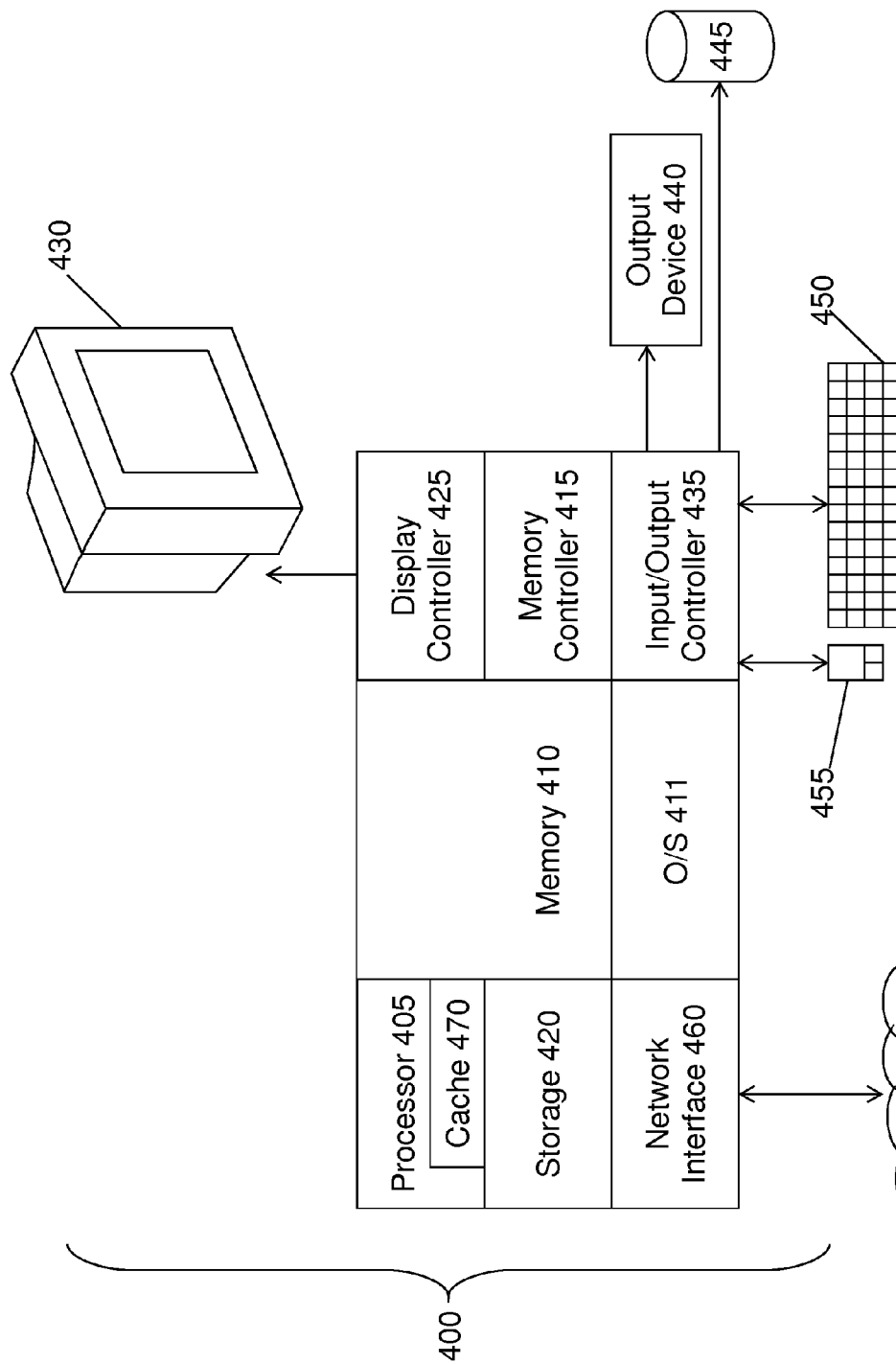
FIG. 4 is a block diagram of a computer system for implementing some or all aspects of the evaluation system, according to some embodiments of this disclosure.

FIG. 4 illustrates a block diagram of a computer system 400 for use in implementing an evaluation system or method according to some embodiments. The evaluation systems and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the evaluation systems and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Evaluation systems and methods according to this disclosure may be embodied, in whole or in part, in computer program products or in computer systems 400, such as that illustrated in FIG. 4.

Technical effects and benefits of some embodiments include the ability to evaluate a feature and to provide information to a user to assist the user in deciding whether to incorporate the feature into a computer system 400. As a result, the user can determine, for example, whether the feature is able to run on a system, whether the feature provides a useful benefit, how the feature will interact (e.g., mutual exclusions) with other features on the computer system 400, whether the feature is an enhancement of another feature currently incorporated into the computer system 400, and whether the feature is already in use on the computer system 400.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:

maintaining a feature repository comprising one or more current feature descriptors describing one or more current features currently incorporated into a computer system, wherein each of the one or more current feature descriptors is a data structure describing a respective current feature of the one or more current features;

applying natural language processing to official documentation, provided by at least one of a manufacturer and a vendor, for a new feature;

applying natural language processing to one or more customer responses to the new feature to determine a description of the new feature;

generating a new feature descriptor of the new feature based on the natural language processing of the official documentation and the natural language processing of the one or more customer responses, wherein the new feature descriptor is a data structure describing the new feature;

evaluating, by a computer processor, the new feature descriptor with respect to a computer system, the evaluating comprising comparing the new feature descriptor to the one or more current feature descriptors;

generating exploitation data based on the evaluating, the exploitation data describing a potential use of the new feature on the computer system;

returning the exploitation data to a user; and storing the new feature descriptor in the feature repository, responsive to the new feature being installed on the computer system.

2. The method of claim 1, wherein the exploitation data includes an indication that the new feature is already in use on the computer system.

3. The method of claim 1, wherein the exploitation data includes an indication that one or more dependencies of the new feature are not met by the computer system.

4. The method of claim 1, wherein the exploitation data includes an indication that one or more mutual exclusions with the new feature exist on the computer system.

5. The method of claim 1, wherein the exploitation data includes an indication that the new feature is an improvement over a current feature, of the one or more current features, on the computer system.

6. The method of claim 1, wherein the one or more current features and the new feature are software features.

* * * * *